(12) United States Patent
Matsumoto

(10) Patent No.: US 8,392,425 B2
(45) Date of Patent: Mar. 5, 2013

(54) DOCUMENT MANAGEMENT SYSTEM

(75) Inventor: Yoshitaka Matsumoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 26 days.

(21) Appl. No.: 13/049,710

(22) Filed: Mar. 16, 2011

(65) Prior Publication Data
US 2011/0238668 A1 Sep. 29, 2011

(30) Foreign Application Priority Data
Mar. 23, 2010 (JP) ................................ 2010-066344

(51) Int. Cl.
G06F 7/00 (2006.01)
G06F 17/30 (2006.01)

(52) U.S. Cl. ........................................................ 707/741

(58) Field of Classification Search .................... 707/741
See application file for complete search history.

(56) References Cited

U.S. PATENT DOCUMENTS

| | | | |
|---|---|---|---|
| 5,506,984 A * | 4/1996 | Miller | 1/1 |
| 5,560,005 A * | 9/1996 | Hoover et al. | 1/1 |
| 7,739,308 B2 * | 6/2010 | Baffier et al. | 707/802 |
| 8,112,459 B2 * | 2/2012 | Dettinger et al. | 707/810 |
| 2009/0307782 A1 | 12/2009 | Matsumoto | |

FOREIGN PATENT DOCUMENTS

| | | |
|---|---|---|
| EP | 1063598 A2 | 12/2000 |
| JP | 2001067349 A | 3/2001 |

OTHER PUBLICATIONS

U.S. Appl. No. 13/151,972, filed Jun. 2, 2011 by Yoshitaka Matsumoto.

* cited by examiner

*Primary Examiner* — Binh V Ho
(74) *Attorney, Agent, or Firm* — Fitzpatrick, Cella, Harper & Scinto

(57) ABSTRACT

In a document management system that manages index item definition and document data by cabinet, an index can be easily provided. A user that can log into a first database can use an index item defined by the first database to provide an index value to document data stored in a second database.

6 Claims, 17 Drawing Sheets

DOCUMENT MANAGEMENT SYSTEM

BACKGROUND OF THE INVENTION

1. Field of the Invention

The present invention relates to a document management system, more specifically to a document management system to manage document data by using an index.

2. Description of the Related Art

Conventionally, in a document management system, document data is managed by a cabinet (database). Since a cabinet is a unit for management, a type of index to attach the cabinet, an accessible user and an access right can be set and managed by the cabinet. By utilizing the cabinet on a department or project basis, management works, such as setting up of an accessible user and security of document data, can be easily performed.

Meanwhile, a user that actually uses a cabinet sometimes has to access information of another department in the course of his/her work (for example, a user in a development department accesses the cabinet of another department such as the planning department). In such a case, the following methods have been conventionally used in order to view document data managed by another department.

Document data is sent off-line without direct access of the user to the cabinet.

Every time a request to a cabinet of another department occurs, a user/access right is set.

The first method of the above is not effective in terms of security and maintenance of document data. Therefore, considering document management in a cabinet, the second method is often used. However, as described above, each cabinet is managed by each department in its own way regarding user management and the index to attach to the cabinet. Accordingly, every time a user accesses a cabinet of another department, an additional setting of the user is required. In such a case, the user needs to access document on the basis of additional information provided by another department (that is, information different from the user's own department).

Each department may use different information as index information, for example, to refer to a product. For example, a development department may use a development name whereas a planning department may use a product name.

Japanese Patent Laid-Open No. 2001-067349 discloses a system in which when document data managed by a document management device is copied to another document management device, an index is also copied.

In this prior art, when document data is copied, an index value is also copied to the same index item, thereby maintaining the index value. Therefore, the same index item as before can be used to perform a search. If the same index item as that of the copy source is not defined in the copy destination, the value of the index item of the copy source is provided to another index item in the copy destination, according to a preset copy rule. However, the change of the index item of the copy destination causes a problem. That is, when the user performs a search, the user must pay attention to change the index item to be searched depending on the device of the copy destination, which makes search processing complicated.

An objective of the present invention is that when a user provides an index value to the document data, the same index is set to the document data without depending on the stored database, thereby efficiently processing document data search.

SUMMARY OF THE INVENTION

To achieve the above objective, a document management system according to the present invention uses an index item defined in each of a plurality of databases to provide an index value to document data managed in each of the plurality of databases. The document management system includes a document publication setting means set to whether to permit a first user to log into a first database to access document data managed by a second database; and a registration means to use an index item defined in the first database to register an index value as an index value for the document data managed by the second database, on the basis of an instruction by the first user if the first user is permitted to access the document data managed by the second database in the document publication setting means.

According to the present invention, a user that can log into a first database can use an index item defined in the first database to provide an index value to document data stored in another database (a second database). The document data managed by another database can be searched using the same index item, thereby making operation more efficient.

Further features of the present invention will become apparent from the following description of exemplary embodiments (with reference to the attached drawings).

DESCRIPTION OF THE EMBODIMENTS

The best modes for implementing the present invention will be described below with reference to drawings.

<System Concept>

Figure 1:
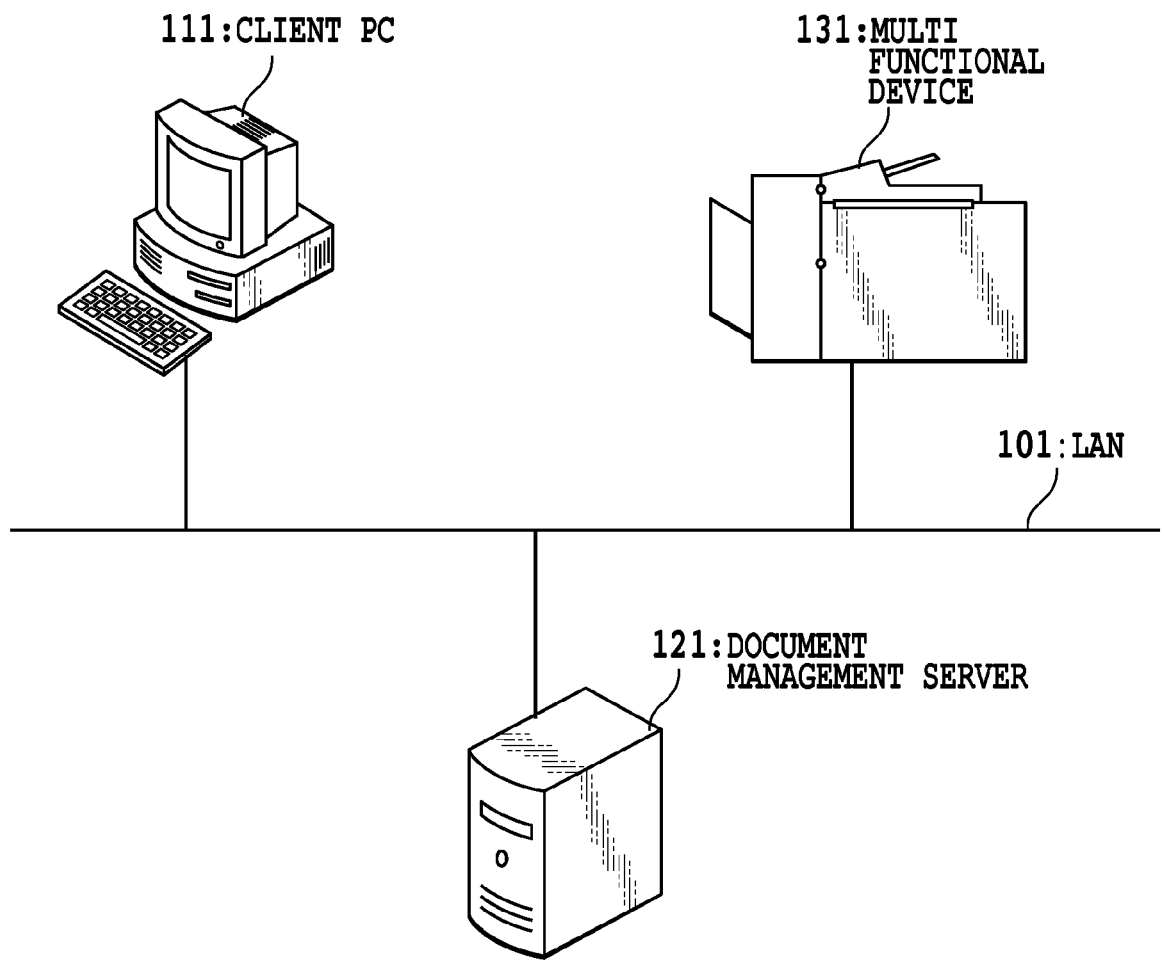
FIG. 1 is a system conceptual diagram illustrating a document management system according to one embodiment of the present invention.

FIG. 1 is a system conceptual diagram illustrating a document management system according to one embodiment of the present invention. In FIG. 1, a LAN 101 indicates a local area network (LAN). Each of the personal computer for a client (hereinafter collectively referred to as "a client PC") 111 and the personal computer for a server (hereinafter referred to as "a server PC") 121 having a document management system according to the present invention is connected to the LAN 101. A multi functional device 131, which has a UI that can provide instruction as a client device of the document management system, is also connected to the LAN 101.

The client PC 111 may be a PC that has a browser, can be connected to the LAN 101, and can instruct the server PC 121. Other configurations are not particularly limited.

Next, the server PC 121 can be any computer as long as it has a server function of the document management system (a document management server). That is, the server PC 121 receives a display instruction or an operation instruction regarding document management from the browser of the client PC 111 or multi functional device 131 (both will be hereinafter referred to as "the client"). When the server PC 121 receives such an instruction, it returns the processing result according to the instruction to the browser of the client that has sent the instruction.

In the present invention, the communication method between the server PC 121 and client is not particularly limited.

The multi functional device 131, as with the client PC 111, has a browser, can be connected to the LAN 101, and can instruct the server PC 121. In addition to this, the multi functional device 131 also has functions such as copying, printing and faxing, but is not particularly limited as long as it has all or some of a print section, a scan section, a fax sending/receiving means as a component.

<PC Hardware Configuration>

Figure 2:
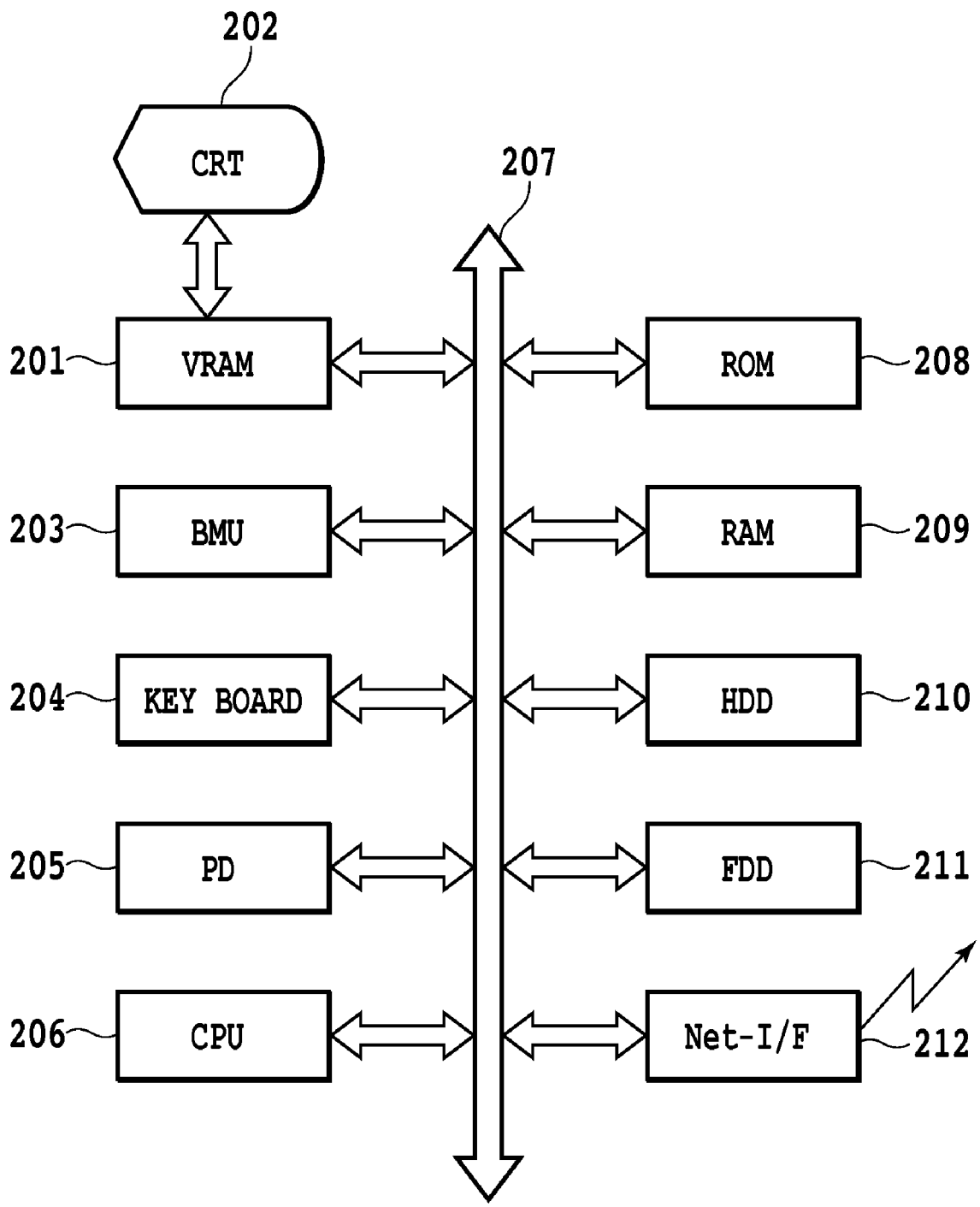
FIG. 2 is a diagram illustrating a hardware configuration of a server and a client PC according to one embodiment of the present invention.

Next, FIG. 2 is a diagram illustrating a configuration of the server PC 121 and client PC 111 illustrated in FIG. 1 according to the present embodiment. Since each of the PCs basically has the same configuration, FIG. 2 will be described as an example.

In FIG. 2, a video RAM (VRAM) 201 develops and stores a character and an image displayed on a screen of a CRT display device 202. The CRT display device 202 displays display information obtained from the VRAM 201 on a screen. For example, in the case of the client PC 111, a browser and so on is displayed here.

A bit move unit (BMU) 203 controls data transfer between memories or between a memory and each device.

A keyboard 204 is one of the input devices that have various keys for inputting. A pointing device (PD) 205 points to an icon and so forth on a screen and instructs a button click and drag.

A CPU 206 controls each section of the present device, based on a control program stored in a ROM 208 (that includes a program to implement processing according to the present invention and an error processing program, as well as a program to implement the present invention that will be described later). A RAM 209 is used as a work area when the CPU 206 implements the aforementioned respective programs or as a temporary saving area during error processing. A hard disc drive (HDD) 210 and a floppy disc drive (FDD, registered trademark) 211 are used for storing an application program, data, a database and a library that will be described later. A network interface (NET-I/F) 212 performs data control and diagnosis on a network in order to transfer data through the network between each device.

An I/O bus 207 connects the aforementioned respective units and is composed of an address bus, a data bus, and a control bus. In the above configuration, when the device is powered on, the CPU 206 initializes the device according to a boot program in the ROM 208, loads an OS from the HOD 210, and then operates various applications. Since the device according to the present embodiment is based on a general-purpose information processing device (for example, a personal computer), the program is stored in a hard disc and so on. The program may be stored in a ROM. Therefore, the present invention is not limited by the storage medium that is used.

<Hardware Configuration of Multi Functional Device>

Figure 3:
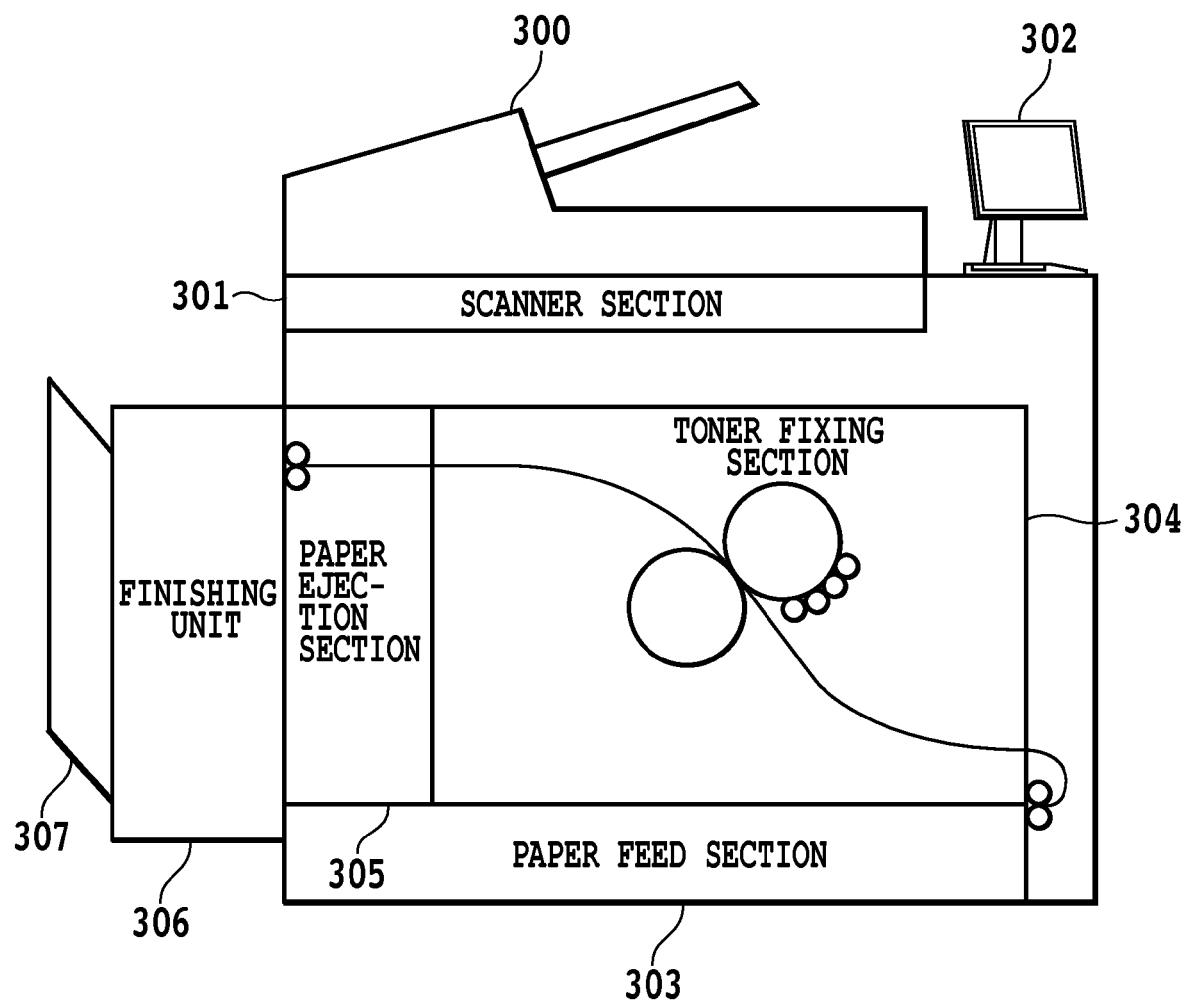
FIG. 3 is a diagram illustrating a hardware configuration of a multi functional device according to one embodiment of the present invention.

FIG. 3 is a diagram illustrating a hardware configuration of the multi functional device 131 illustrated in FIG. 1. The present example is a multi-function printer. A feeder (an automatic document feed section) 300 is a mechanism that automatically feeds document paper when a scanner section 301 performs scanning. The scanner section 301 for a document scans a paper image and generates its corresponding image data. A UI section 302 displays a browser for inputting an operation instruction for the server PC 121 of the present invention. A paper feed section 303 is a mechanism that feeds paper to be printed to the device at the time of printing.

A print section 304 is a mechanism that performs printing by fixing a toner to paper fed by the paper feed section 303. A paper ejection section 305 is a mechanism that ejects the paper that has been printed by the print section 304. A finishing unit 306 is a mechanism that staples the paper ejected from the paper ejection section 305 together or punches a hole in the paper, and so on, according to an instruction from the user. A catch tray 307 finally holds the printed paper that has been subjected to printing and finishing.

<Information Processing Function of Multi Functional Device>

Figure 4:
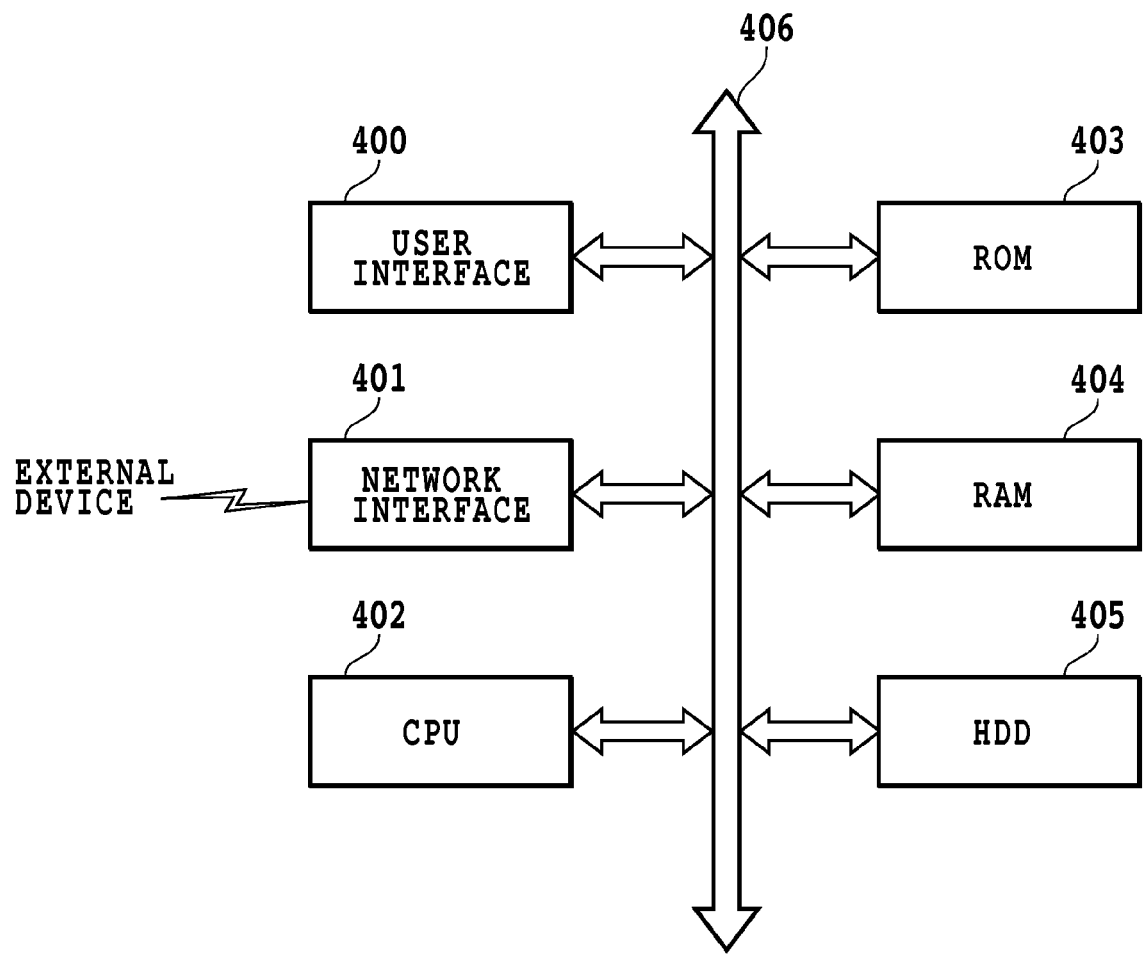
FIG. 4 is a schematic diagram illustrating an information processing function of a multi functional device according to one embodiment of the present invention.

FIG. 4 illustrates a schematic configuration of an information processing function of the multi functional device 131. A user interface section 400 provides a user interface to an operator, enabling the operator to input an instruction and so on to the system. An input device used in the user interface section 400 may be a dedicated keyboard or a touch panel that can be directly instructed from the UI section 302. The network interface section 401 communicates with an external device through a network.

A CPU 402 implements a program to control the entire multi functional device. A ROM 403 stores the embedded program and data. A RAM 404 is a temporary memory area, and expands the program when the program is executed. An HDD 405 is a mass storage memory and an area to store data and so on sent from an external device in the multi functional device. An input/output interface 406 connects the respective control sections.

<Software Configuration>

Figure 5:
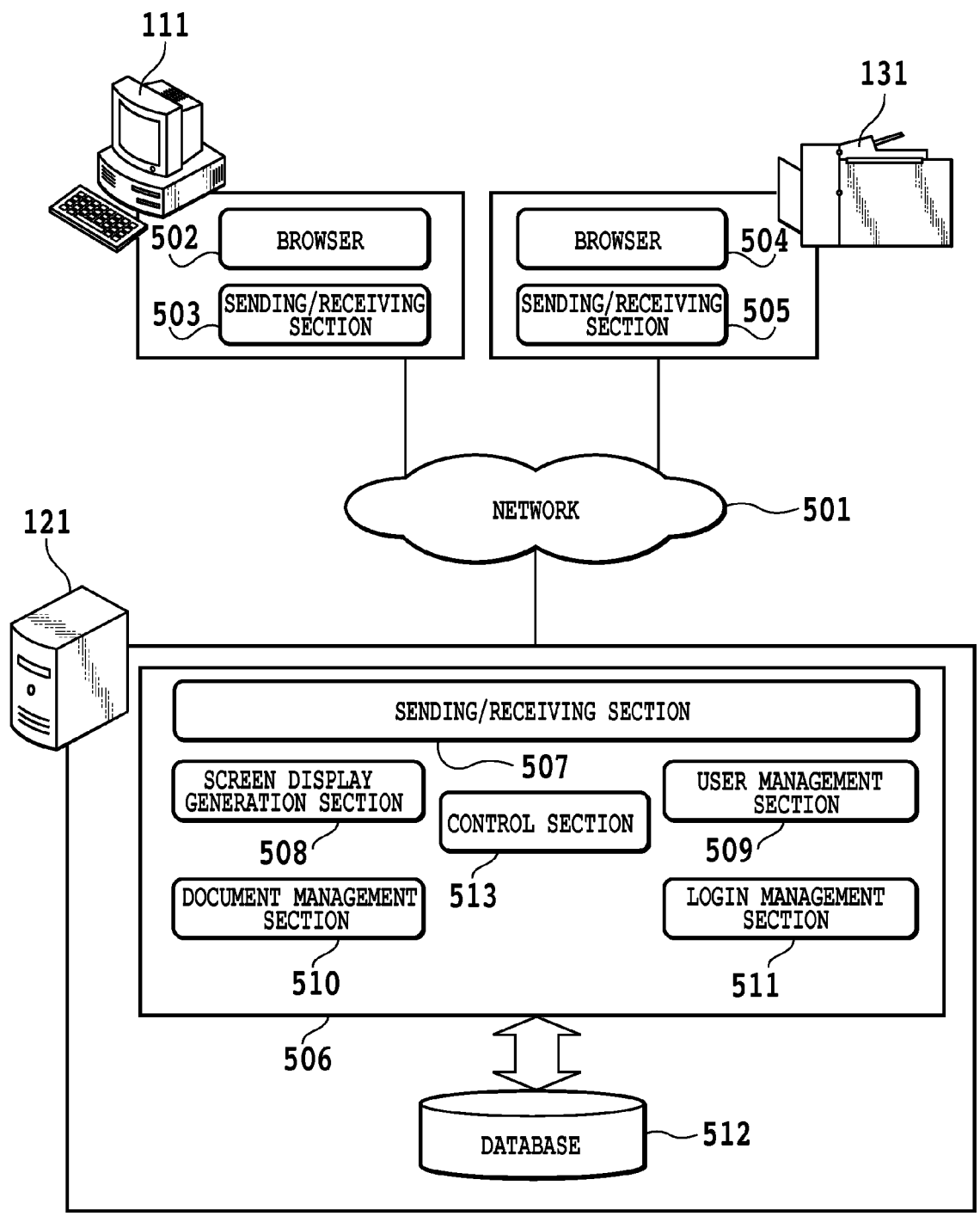
FIG. 5 is a diagram illustrating a software configuration according to one embodiment of the present invention.

FIG. 5 is a software configuration according to one embodiment of the present invention. In FIG. 5, a network 501 is a connection mechanism, such as the LAN 101 illustrated in FIG. 1. The protocol is not particularly limited. Next, the inside of the client PC 111 will be described.

A browser 502 is an application that runs on the client PC 111 and displays the result of sending and receiving data to and from the document management server PC 121 to induce the user to input an instruction. When an operator performs an operation instruction, the inputted operation instruction is sent through a sending/receiving section 503 to the server PC 121. The browser 502 also displays the result that the sending/receiving section 503 has received a replay from the server PC 121. The sending/receiving section 503 sends and receives information between the browser 502 and server PC 121. Next, the configuration within the multi functional device 131 will be described. The browser 504 is an application that is implemented on the multi functional device 131 and, as with the browser 502, displays the result of sending and receiving data to and from the document management server PC 121 through a sending/receiving section 505 to induce the user to input an instruction. The sending/receiving section 505 sends and receives information between the browser 504 and server PC 121.

The configuration within the server PC 121 will be described. A server application 506 loads each processing section within the application on the RAM in response to a request from a client and implements processing. The sending/receiving section 507 receives request information from the sending/receiving section 503 of the client PC 111 and the sending/receiving section 505 of the multi functional device 131 and passes the request information to a control section 513. The sending/receiving section 507 also receives the result of each of the processing sections from the control section 513 and finally returns the result to the client PC 111 and multi functional device 131 as a response.

A screen display generation section 508 generates screen display data to be displayed on the browsers 502 and 504 in response to an instruction from the control section 513 if a request received by the sending/receiving section 507 is a screen display data generation. The generated screen display data may be static HTML data or dynamic data such as JSP.

A user management section 509 performs user management of the document management system according to the present invention. The document management section 510 as a document publication setting means is a core part to realize document management according to the present embodiment. The document management section 510 manages the edition, checks-in and checks-out the document, as well as is set up to document the value of the index item defined in a plurality of cabinets. The specific processing method will be described later.

If the client instruction received from the sending/receiving section 507 is acquisition or operation of a document, a login management section 511 determines the target document depending on the classification property of the operator that has logged in, and provides or operates the target document. The login management section 511 performs authentication processing with the use of the permission setting of the user information managed in the user management section 509, in response to the login request through the browser 502 of the client PC 111 and the browser 504 of the multi functional device 131. The login management section 511 also manages user information that is being logged in from an authenticated user. Furthermore, the login management section 511 provides attribute information in response to the attribute acquisition request of the operator that has instructed it from the document management section 510.

A database section 512 stores the application that manages data. Specifically, the database section 512 stores each piece of screen data generated by the screen display generation section 508, user information managed by the user management section 509, and document management information managed by the document management section 510. As an actual data storage, hardware such as an HDD, an FDD or a RAM can be used. The database section 512 updates or provides information in response to the request. Finally, the control section 513 controls the interaction between the respective processing requests. The present embodiment is composed of the aforementioned applications, processing sections and storage sections within the respective devices.

Relationship Between Index Item Value Setting and Document Management Section in the First Embodiment With reference to FIGS. 6 and 7, in the server PC 121, a method for setting the value of an index item according to a conventional art, as well as a method for setting the index item defined by a plurality of cabinets to document data that is a characteristic of the present invention will be described below.

Figure 6:
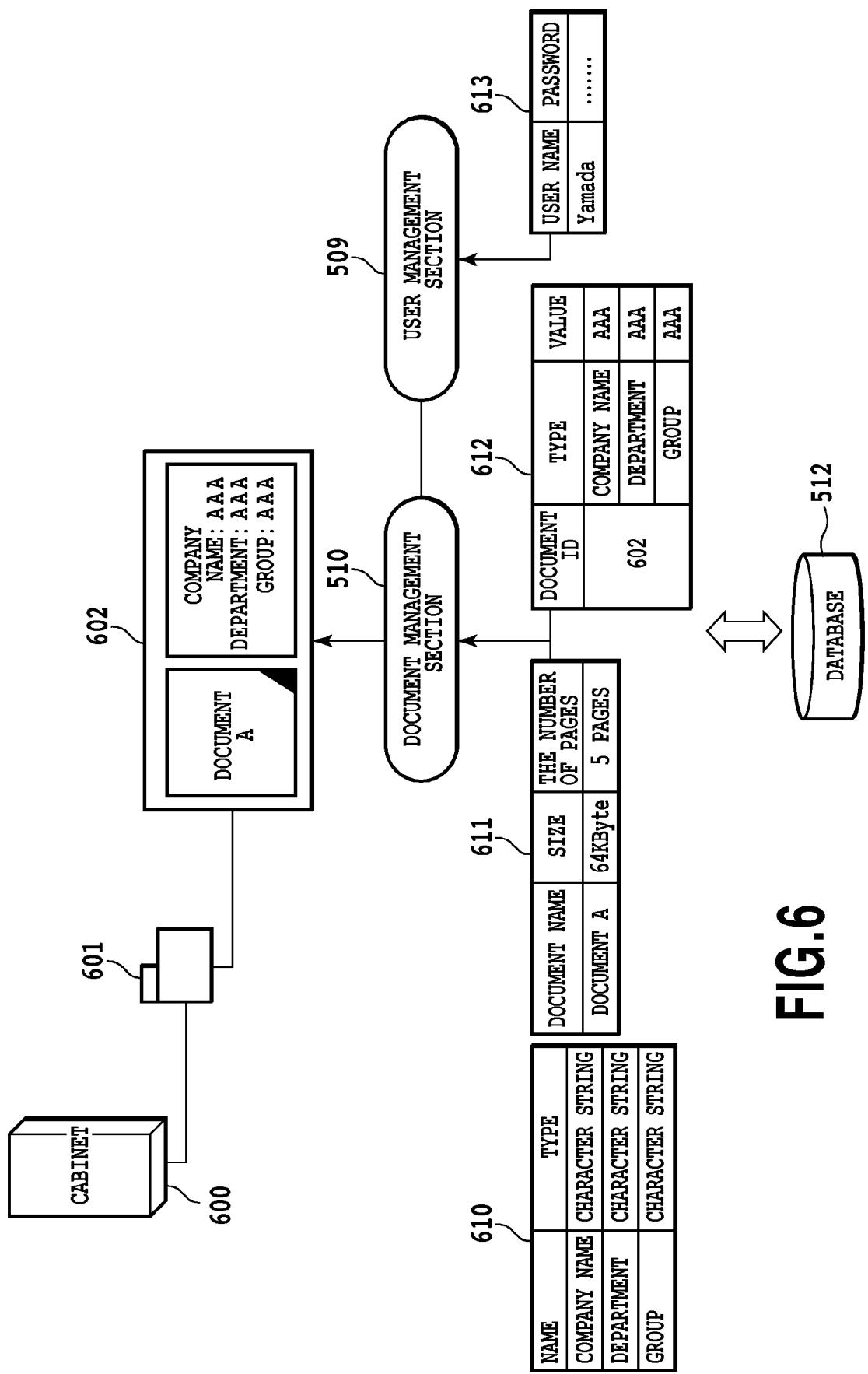
FIG. 6 is an example of a conventional art.

FIG. 6 illustrates an example of a conventional art in order to describe a characteristic of the present embodiment. In FIG. 6, a document system is composed of a cabinet 600, a folder 601 and document data 602. The cabinet 600 is a name used in the document management system and indicates one database that manages the folder 601 and document data 602. Generally, a document management system can manage a plurality of cabinets (That is, one document management server can manage a plurality of databases). The cabinet 600 has definition information for index items in Table 610 and is stored in the database section 512. The cabinet 600 also has document data items in Table 611 and index item values provided to each documents in Table 612. Table 613 manages user information of an operator that can operate the cabinet 600.

In the present embodiment, the index item definition 610 is composed of the name and type of the item. Any name can be provided to the item, and the type indicates the data form inputted for each item and can employ various types, such as a character string type, a numerical type and a date type. The document data item 611 stores document data of the document stored in the cabinet and is information for managing a document name and size and so on. Managed Data can be variously set, such as the document name, size and the number of pages of the document data 602 and the item is not particularly limited. The index item value 612 can store the value of an item defined by the index item definition 610 by each piece of document data. The index item value 612 is composed of ID for identifying document data, and the name and value of the index item. The folder 601 is hierarchically managed under the cabinet 600. An additional folder can be generated under the folder 601.

The document data 602 is managed under the folder 601. The document data 602 is composed of document data itself (main data of the document "document A") and an index item value, as one piece of document data. The document management section 510 obtains each piece of data from the database 512 and composes the document data 602. Here, a problem in the conventional art is that since user information and the index item definition is managed by the cabinet, the index item value set for the user's login and document data is effective only within its cabinet. That is, since the index item defined for the cabinet 600 is information defined in Table 610, the index item in Table 610 is usually used to set the index value for the document data 602.

For example, if the document management system manages a plurality of cabinets, user information and the index item definition are different between the cabinets. Usually, since each cabinet is managed by department or by team, an administrator registers the user and defines the index item according to each management. Conventionally, if the user works for a plurality of teams, the administrator first needs to manage the user's registration and access right to document data by the cabinet so that the user can operate the cabinet of each of the teams for which the user works. Then, the user that works for the plurality of teams can access each cabinet to operate document data. However, since index items are different between the cabinets, there is a problem that when the index item value is set for each piece of document data that is managed by each cabinet, the user that works for the plurality of teams must pay attention to the index item name and the operation becomes complicated. There is another problem that when the index item is specified search for document data, the operation also becomes complicated.

Therefore, in order to solve the above problems, according to the present invention, when the user accesses another cabinet, the user ID and the access right that allows the user to log into the cabinet are set, instead of individually setting the user registration and access right. In addition, for one document data managed by the cabinet, the index item defined by another cabinet can be used to set the value. By this, the same index item name can be used to operate document data in a plurality of cabinets. With reference to FIG. 7, this processing will be described.

Figure 7:
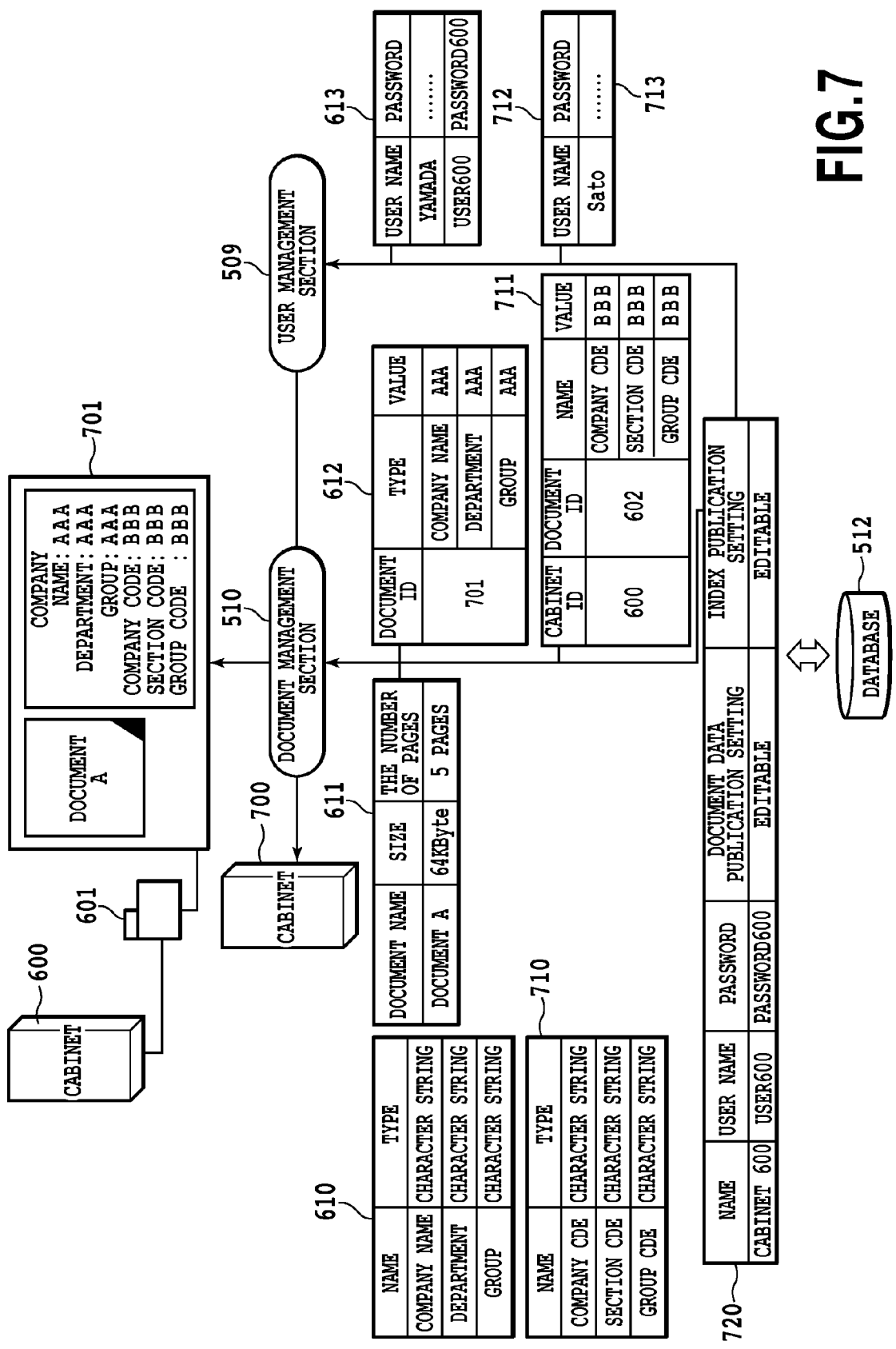
FIG. 7 is a conceptual diagram illustrating document management according to the present invention.

FIG. 7 illustrates an example of the document management system of the present embodiment. The document management section 510 manages two cabinets 600 and 700. The cabinets 600 and 700 are stored in the database 512 and are independent of each other. Index item definition information for the cabinet 600 is provided in Table 610, and index item definition information for the cabinet 700 is provided in Table 710. The index item value managed by the cabinet 600 is managed in Table 612, and the index item value managed by the cabinet 700 is managed in Table 711. Document data 701 stored in the cabinet 600 is composed of data itself managed by the document data item 611, the index item value 612 managed by the cabinet 600 and the index item value 711 managed by the cabinet 700. That is, the index item value 711 managed by the cabinet 700 can be used to provide the index to the document data 701 managed by the other cabinet 600. The document management section 510 obtains each piece of data from the database 512 and composes the document data 701. The index item value 711 is set using the item name of the index item definition 710 managed by the cabinet 700.

The index item value 711 stores the cabinet ID for identifying the cabinet, the document ID for identifying the target document, and the index name defined in the index 710 and its index value. The cabinet ID and document ID are used to identify which document data of which cabinet the index value is provided to. By setting an ID for identifying the cabinet 600 and the ID for identifying the document 71, the index item 710 managed in the cabinet 700 can be used to provide an index to the document data 701 managed in the other cabinet 600.

User information of the operator that can operate the cabinet 600 is managed in Table 613, and user information of the operator that can operate the cabinet 700 is managed in Table 712. The User 713 is the user ID and password for publication that is used for verification when the user of the cabinet 700 logs into the cabinet 600 in order to operate the document data 701. The User 713 is registered and managed by the user management section 509, and for example, is set so that the user that can access the cabinet 700 can use the User 713. Cabinet information 720 manages information that indicates the operation that can be performed for document data (document data publication setting) and the operation that can be performed for index data (index item publication setting) when the cabinet 600 is accessed using the User ID 713. The cabinet information 720 is managed by the cabinet 700 of the database 512. When the user attempts to log into the cabinet 700, login verification is first performed using data in Table 712. Then, the user that has been permitted to log into the cabinet 700 can use the user name and password stored in the cabinet information 720 to access the cabinet 600.

As described above, the document management section 510 and user management section 509, which are characteristics of the present invention, can generate a user profile that can log into and set its access right, thereby permitting the user to log into a plurality of cabinets without registering a plurality of users. As a result, the index item defined by a plurality of cabinets can be easily set to document data.

Figure 8:
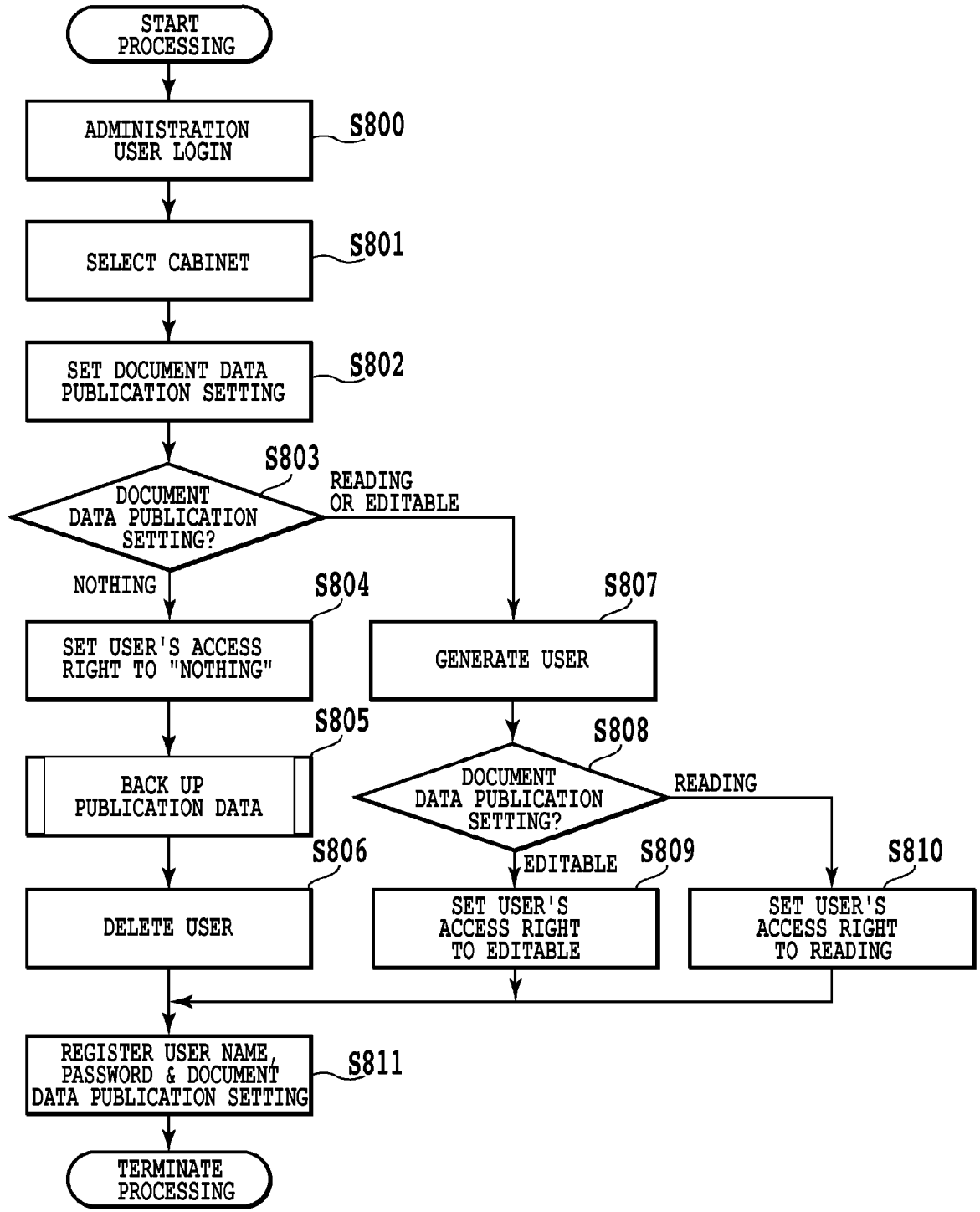
FIG. 8 is a flow chart illustrating a cabinet data publication processing according to the first embodiment.

Login Setting and Document Data Publication Setting Processing in the First Embodiment FIG. 8 is a flow chart illustrating processing of generating user information that can be used when a user of the cabinet 700 logs into the cabinet 600 and to register document data publication setting of the cabinet 600. The document management section 510, user management section 509, control section 513 and sending/receiving section 507 are implemented as one function of the software and realized by a computer including a CPU, a RAM and an HDD. Similarly, the database 512 includes a database application to store each piece of data, performed and processed by a CPU, a RAM, an HOD and so on.

A program or code that performs procedures illustrated in the flow chart is stored in the storage of either of the RAM and HDD of the control section 513 and database 512, and is performed by the CPU. The same applies to drawings illustrating a flow chart that will be described later.

First, at S800, the browser 502 receives from an administration user a user name and password that are inputted in order to log into the cabinet 600. Next, the received user name and password are sent through the network 501 to the sending/receiving section 507 of the server PC 121. The sending/receiving section 507 passes the received user name and password to the control section 513. The control section 513 verifies these user name and password of the administration user. If the verification succeeds, processing proceeds to S801.

At S801, selection of the cabinet 600 to be published, which the user of the cabinet 700 will be permitted to access to, is received from the administration user. At S802, for document data managed in the selected cabinet 600, whether to permit editing and reading is set. The browser 502 that has received the instruction to change document data publication setting from the administration user at S802 sends the received document data publication setting and the selected cabinet received at S801 through the network 501 to the sending/receiving section 507 of the server PC 121. The document data publication setting and selected cabinet information is further sent to the control section 513. At S803, the control section 513 determines the publication setting specified for the document data managed in the selected cabinet 600.

Figure 13:
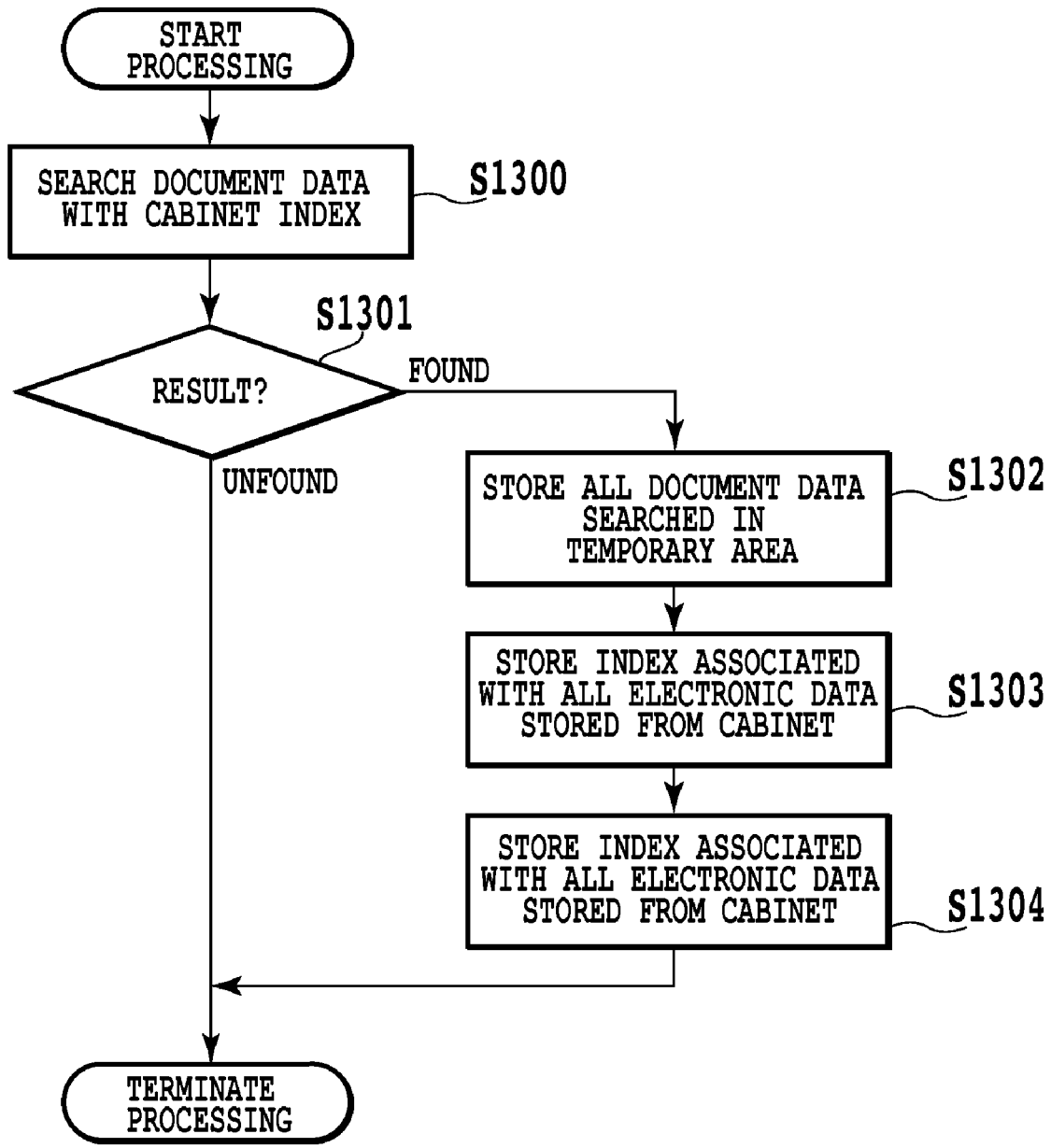
FIG. 13 is a flow chart illustrating a publication document data backup processing according to the first embodiment.

If at S803 the control section 513 determines that document data publication setting is "nothing", the processing proceeds to S804 and an access right to the document data 701 is not set. If an access right has been already set, the access right is deleted. At S805, the document data 701 is backed up to an area on the hard disc drive (HDD) 210 that can be accessed by the administration user and a file server that can be accessed by a user of the cabinet 700, and processing illustrated in FIG. 13 is performed. At S806, the user name and password of the User 713 that were generated at S807 are deleted.

If at S803 the control section 513 determines that document data publication setting is "reading" or "editable", the user name and password are generated at S807 and registered to Table 613. At S808, the control section 513 determines the access right, depending on the document data publication setting received at S802. If the document data publication setting is determined to be "editable", the access right to permit editing the document data 701 is set at S809. If the document data publication setting is determined to be "reading", the access right to permit only reading the document data 701 at S810.

At S811, the control section 513 registers the access right that was set at S804, S809 and S810, as well as the user name and password that were generated at S807 to the cabinet information 720.

Index Publication Setting Processing in the First Embodiment

Figure 9:
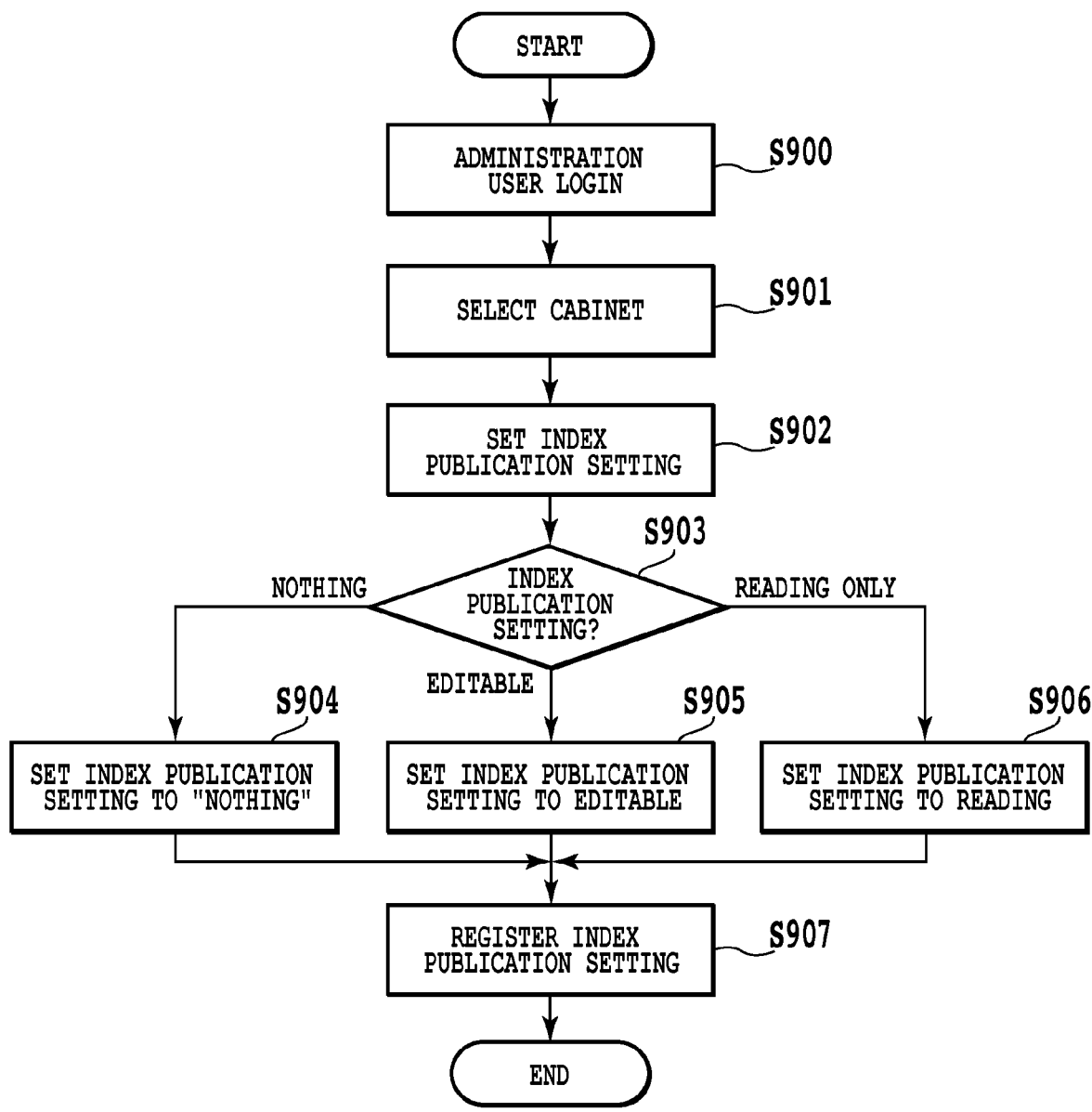
FIG. 9 is a flow chart illustrating an index publication processing according to the first embodiment.

FIG. 9 is a flow chart illustrating processing for setting and registering index publication of the cabinet 600 according to the present embodiment. When the user of the cabinet 700 operates Table 612 of index item values set for the document data 701, processing is performed according to the result that was set in the flow chart illustrated in FIG. 9.

At S900, the browser 502 that has received the user name and password for logging into the cabinet 600 from the administration user sends the received user name and password thorough the network 501 to the sending/receiving section 507 of the server PC 121. The sending/receiving section 507 further sends the received user name and password information to the control section 513. The control section 513 verifies these received user name and password.

At S901, selection of the cabinet 700 to be published is received from the administration user. The browser 502 receives index publication setting from the user at S902, and sends the received index publication setting as well as the selection of cabinet received at S901 through the network 501 to the sending/receiving section 507 of the server PC 121. The sending/receiving section 507 further sends them to the control section 513.

At S902, index publication setting information specified by the administration user is received. The instruction regarding whether to permit the user of the cabinet 700 to edit or read Table 612 of index item values is received.

At S903, the control section 513 determines the access right to Table 612 of index item values specified for the user generated at S807, according to the index publication setting information received at S902. At S904, the control section 513 does not set the access right if at S903 the index publication setting is determined to be "nothing".

At S905, the control section 513 sets an access right to permit editing if at S903 the index publication setting is determined to be "editable". At S906, the control section 513 sets the access right to permit only reading if at S903 the index publication setting is determined to be "reading". At S907, the control section 513 registers the access right that was set at S909, S905 and S906 to the cabinet information 720.

Document Data Operation Processing in the First Embodiment

Figure 10:
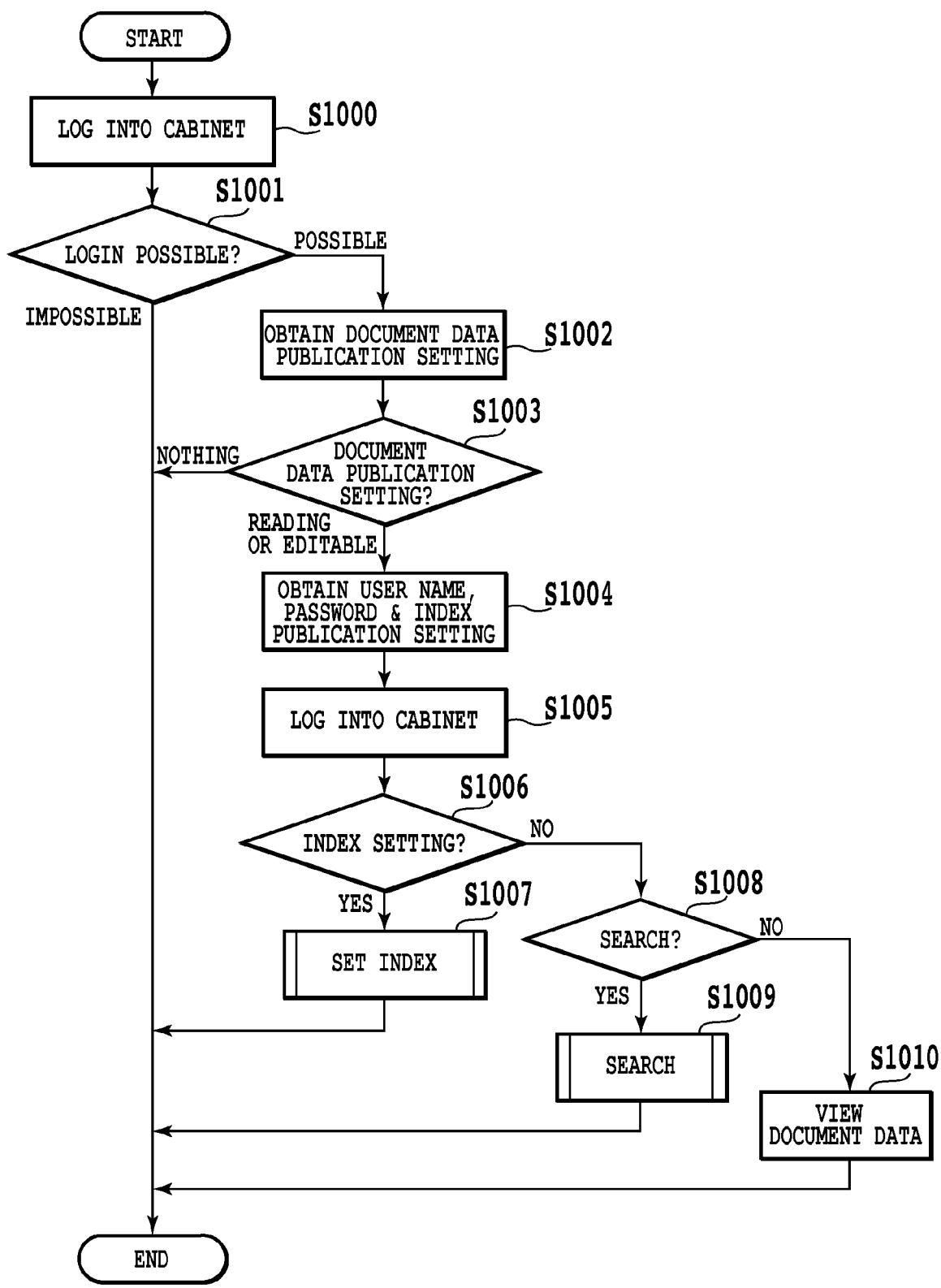
FIG. 10 is a flow chart illustrating a document data operation processing according to the first embodiment.

FIG. 10 is a flow chart illustrating processing where the user of the cabinet 700 operates the document data 701 of the cabinet 600 according to the present embodiment. At S1000, the browser 502 that has received from the user of the cabinet 700 that seeks to login the user name and password of the user sends the received user name and password through the network 501 to the sending/receiving section 507 of the server PC 121. The sending/receiving section 507 sends the received user name and password information to the control section 513. The control section 513 verifies the received user name and password on the basis of the user information 712.

At S1001, the control section 513 determines the result of the verification at S1000. If the user name or password is invalid, the flow will terminate. If at S1001, it is determined that the user name and password are valid, the control section 513 obtains the document data publication setting registered at S811 from the cabinet information 720 at S1002.

At S1003, the control section 513 checks the document data publication setting obtained at S1002. If the document data publication setting is determined to be "nothing", the flow will terminate. If at S1003 the document data publication setting is determined to be "reading" or "editable", the control section 513 obtains the user name and password registered at S811 from the cabinet information 720 at S1004. Similarly, the control section 513 obtains the index publication setting registered at S907.

At S1005, the control section 513 verifies the user name and password obtained at S1004 on the basis of the user information 713. At S1006, the browser 502 that has received operation from the user sends the content of the received operation through the network 501 to the sending/receiving section 507 of the server PC 121. The sending/receiving section 507 further sends the content of the received operation to the control section 513. The control section 513 checks the received operation. If the operation is determined to be index setting, a flow processing to display and edit the index is performed at S1007, which will be illustrated in FIG. 11.

Figure 12:
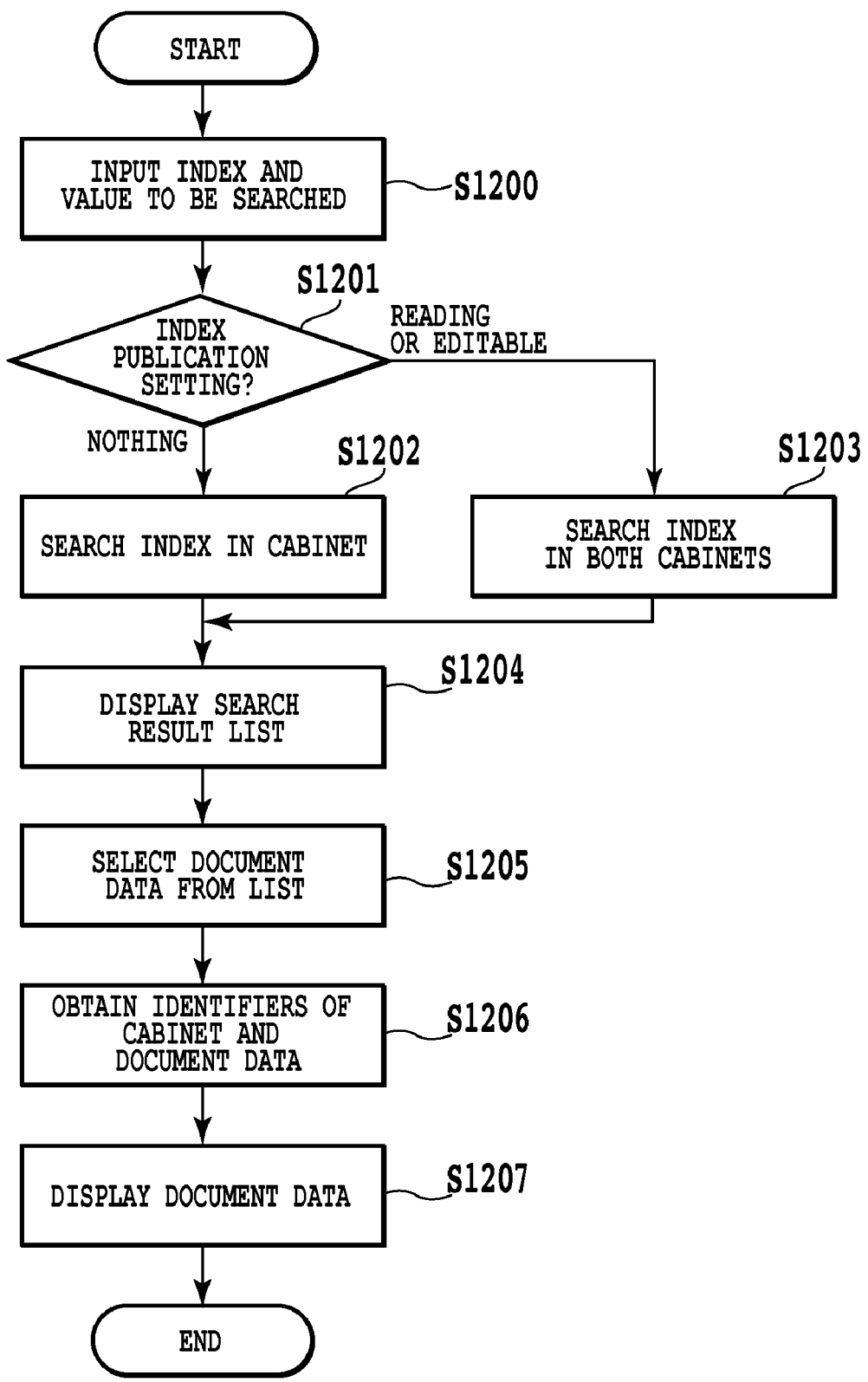
FIG. 12 is a flow chart illustrating a document data search processing according to the first embodiment.

If at S1008 the control section 513 determines that the operation received at S1006 is "search", a flow processing of searching from the index is performed at S1009, which will be illustrated in FIG. 12. If it is determined to be an operation other than "search", S1010 is performed. At S1010 the browser 502 that has received the selected document data view operation from the user sends the content of the received operation through the network 501 to the sending/receiving section 507 of the server PC 121. The sending/receiving section 507 further sends the received operation content through the control section 513 to the document management section 510. The document management section 510 that has received the "selected document data view" obtains document data from Table 611 of document data items and sends the document data to the browser 502. The browser 502 receives and displays the document data.

Index Item Value Setting Processing in the First Embodiment

Figure 11:
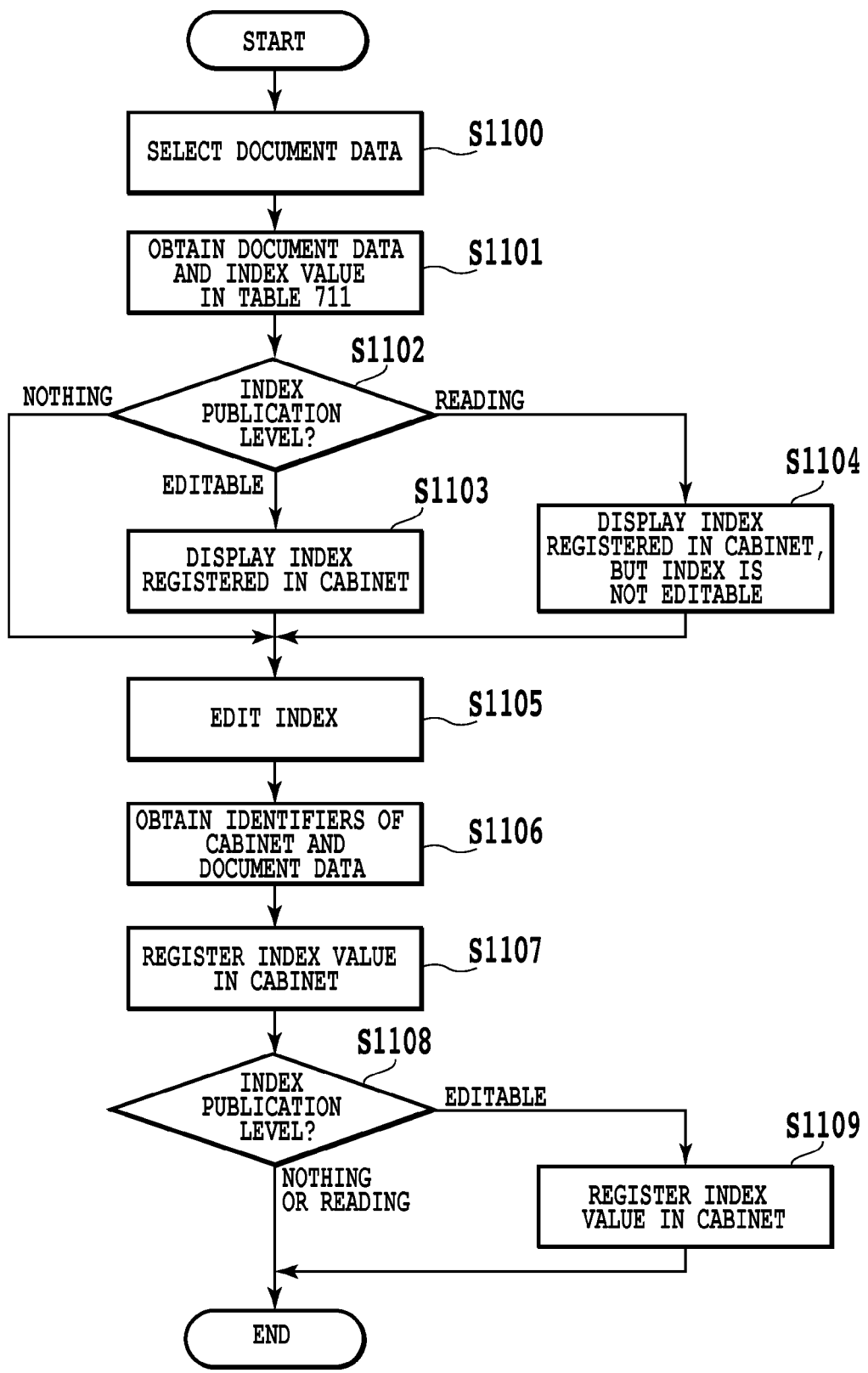
FIG. 11 is a flow chart illustrating an index setting processing according to the first embodiment.

FIG. 11 is a flow chart illustrating processing where the user of the cabinet 700 sets an index item and value for the document data 701 of the cabinet 600 according to the present embodiment. At S1100, the browser 502 that has received the selected document data view operation from the user sends the content of the received operation through the network 501 to the sending/receiving section 507 of the server PC 121. The sending/receiving section 507 further sends the content of the received operation through the control section 513 to the document management section 510.

At S1101, the document management section 510 that has received the "selected document data view" obtains selected document data, as well as the index associated with the selected document data from Table 711 of index item values. If there is no index associated with the document data, it obtains the document data and the index item definition 710 that can be managed in Table 711. The obtained document data, index item information defined by the cabinet 700, and index item value managed in Table 711 are sent to the browser and displayed. Since data stored in Table 711 is data managed by the cabinet 700, the user of the cabinet 700 can edit the index item value in Table 711.

At S1102, the control section 513 checks the index publication setting value obtained at S1004.

If at S1102 the index publication setting is determined to be "editable", processing proceeds to S1103 where the index item and value associated with the document data 701 are obtained from Table 612 of the cabinet 600. The control section 513 sends the index item and value obtained from Table 612 to the browser. That is, the browser 502 displays the index item and value of Table 612 in addition to the index item and value of Table 711 received at S1102. After that, if the user inputs an index setting instruction (editing instruction), the displayed index item value (index value) will be set.

If at S1102 the control section 513 determines that index publication setting is "reading", the index item and value associated with the document data 701 are obtained from Table 612 at S1104, as with at S1103. The control section 513 sends the index item and value obtained from Table 612 to the browser. The browser 502 displays the index item and value of Table 612 in addition to the index item and value of Table 711 received at S1101. At this time, the user has been able to edit the index item value managed in Table 711. However, processing is performed so that the index item value managed in Table 612 cannot be edited. For this processing, various methods can be used, such as a method that does not receive operation or a method that receives operation but does not update the display, but the method is not particularly limited.

If at S1102 index publication setting is determined to be "nothing", the processing proceeds to S1105. Accordingly, the browser 502 displays the index item and value of Table 711 received at S1101, but does not display the index item and value of Table 612.

At S1105, the browser 502 that has received the setting instruction (editing instruction) of the index item value managed in Table 711 or Table 612 from the user updates the display by the received index value. The edited index item value will be sent through the control section 513 to the document management section 510. Then, the user can use the index item defined in the cabinet 700 to provide the index value (that is, the index value that can be managed in Table 711) to the document managed in the cabinet 600.

If the edited index item value is data managed in Table 711, the document management section 510 further specifies a cabinet ID and document data ID of which the index item value has been updated at S1106. At S1107, the updated index item value is registered to the index item value in Table 711 associated with the cabinet ID and document data ID specified at S1106. That is, if the received index value is different from the value in Table 711 obtained in S1101, the index value is deemed to be updated, and data in Table 711 is updated (set).

At S1108, the index publication setting obtained at S1004 is checked. If the index publication setting is determined to be "nothing" or "reading", the processing will terminate. If the publication setting is determined to be "editable", the processing proceeds to S1109. At S1109, it is checked whether or not the received index item value is the index item value managed in Table 612. If it is determined that the index item value managed in Table 612 obtained at S1103 has been updated, the updated index item value is registered to Table 612.

Document Data Search Processing in the First Embodiment

FIG. 12 is a flow chart illustrating processing where the user of the cabinet 700 searches document data from the index item according to the present embodiment.

At S1200, the browser 502 that has received from the user the index item and value to be searched sends the received index item and value through the network 501 to the sending/receiving section 507 of the server PC 121. The sending/receiving section 507 sends the received index item and value to the control section 513. At S1201, the control section 513 checks the index publication setting obtained at S1004. If index publication setting is determined to be "nothing", S1202 is performed.

At S1202, the index item and value received at S1200 are used to search Table 711. The search method includes obtaining a value from Table 711 and comparing the value with the value received at S1200. Alternatively, another method to issue an SQL command and search may be employed, but the method is not particularly limited. The control section 513 sends the search result back.

At S1201, if the index publication setting is checked and determined to be "reading" or "editable", the index item value is used to search Table 612 and Table 711 at S1203. This search method is not particularly limited, as with at S1202. The control section 513 sends the search result back. At S1204, the browser 502 receives and displays the result.

If at S1205 the user selects document data from the displayed search result, the browser 502 that has received the selected document data sends the received selected document data through the network 501 to the sending/receiving section 507 of the server PC 121. The sending/receiving section 507 further sends the received selected document data through the control section 513 to the document management section 510.

At S1206, the document management section 510 that has received the selected document data obtains document data from Table 611 of document data items and sends the obtained document data back to the browser 502. At S1207, the browser 502 receives and displays the document data.

Document Data Backup Processing in the First Embodiment

FIG. 13 is a flow chart illustrating processing of backing up the document data 701, thereby enabling the document data to be viewed even if the document data cannot be viewed by document data publication setting. According to the present embodiment, if document data publication setting is set to "nothing", document data cannot be viewed and therefore its index item value cannot be viewed, either. In such a case, backing up the document data 701 enables the document data to be viewed even if viewing is not permitted by document data publication setting.

At S1300, the control section 513 obtains the index item and value set for the document data 701. If at S1301 the control section 513 determines that one or more index item and value were obtained at S1300, S1302 is performed. If the control section 513 determines that there is no index, the processing will terminate.

At S1302, the control section 513 obtains data of the document data 701, and stores the data into an area on the hard disc drive (HDD) 210 that can be accessed by the administration user and a file server that can be accessed by the user of the cabinet 700. A storage destination may be decided in various methods, such as preliminarily setting a storage destination or selecting any storage destination, but the method is not particularly limited.

At S1303, Table 711 of index items and values set for the document data 701 is stored into an area on the hard disc drive (HDD) 210 that can be accessed by the administration user and the file server that can be accessed by the user of the cabinet 700.

In storing the Table, the storage method is not particularly limited, as with at S1302. At S1304, Table 612 of index item values set for the document data 701 is stored into an area on the hard disc drive (HDD) 210 that can be accessed by the administration user. Table 612 of index item values set for the document data 701 can be stored into a temporary area such as a file server that can be accessed by the user of the cabinet 700. In storing the Table, the storage method is not particularly limited, as with at S1302.

As described above with reference to drawings, by using the first embodiment, a plurality of cabinets can be logged into without performing processing of registering a plurality of users. This can realize a document management system in which an index item defined for a plurality of cabinets can be easily set to document data.

Index Item Value Setting and Document Management Section In the Second Embodiment Next, a system according to another embodiment of the present invention will be described.

According to the second embodiment, the item of the index 610 set for document data in the first embodiment is selected and set. Par example, if the index item of a plurality of cabinets is set for document data, there is the case in which the user other than the user of the cabinet wants to be prevented from setting an operation.

<Index Item Selection>

Figure 14:
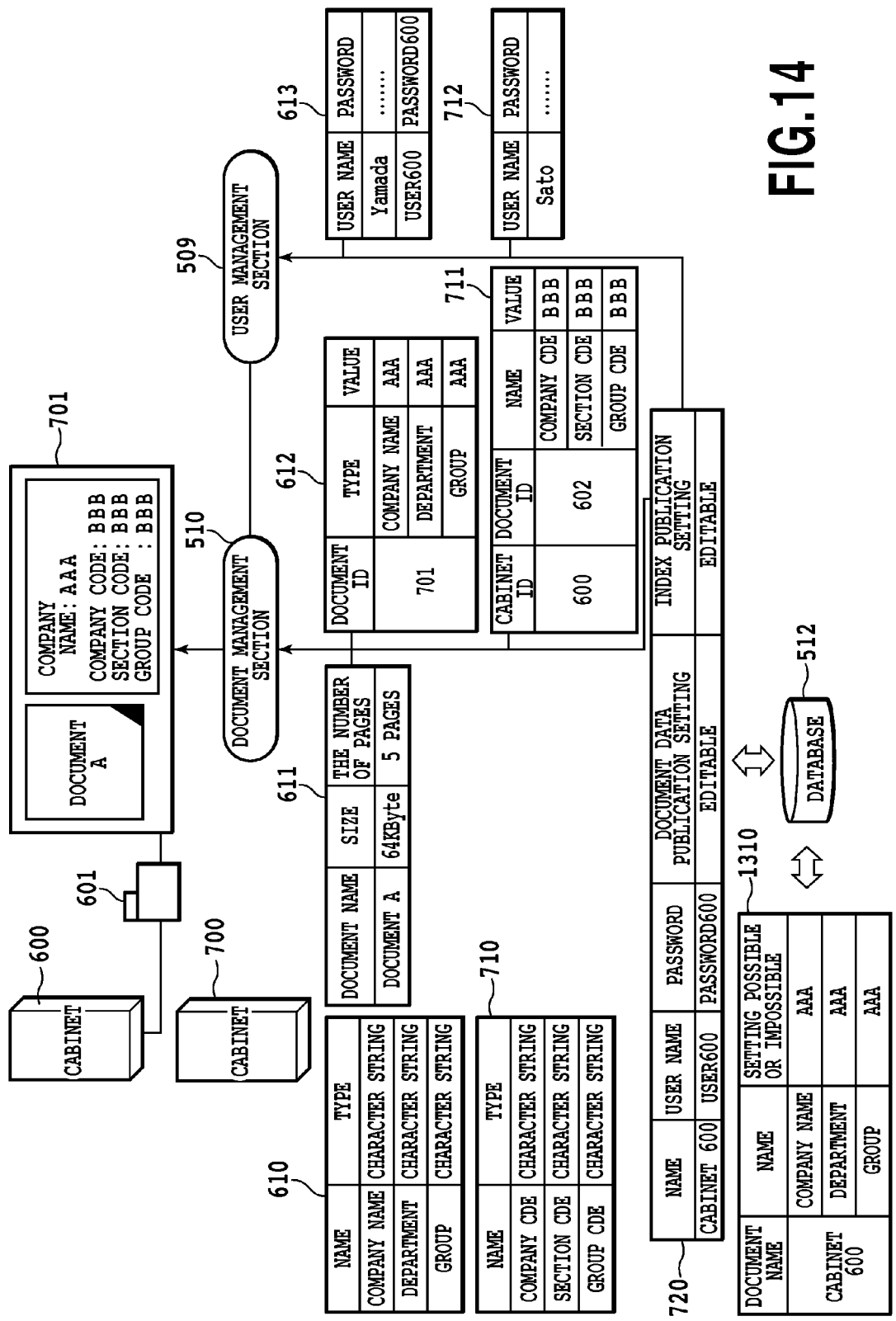
FIG. 14 is a conceptual diagram illustrating document management that shows a characteristic of the second embodiment of the present invention.

FIG. 14 is a conceptual diagram of document management to select an index item that can be set for document data. Since FIG. 14 is basically the same as FIG. 7, only differences will be described. First, the diagram illustrates that document data 1301 is composed of the values in Table 612 and Table 711 of index item values. As the index item value, only the company name is displayed in the values in Table 612.

Table 1310 is index operation setting that shows the index item that can be operated if the index is set to publish the index items of the cabinet 600. In FIG. 14, if the index item is True, the index item can be operated, and if the index item is False, the index item cannot be operated. However, the setting method is not particularly limited, and any setting method known in this art field can be used.

When the document management section 510 composes the document data 1301, the document management section 510 can obtain the index item value from Tables 612 and 711, as well as the index item that can be operated from Table 1310 of index items thereby to compose the document data 1301.

Index Publication Setting Processing in the Second Embodiment

Figure 15:
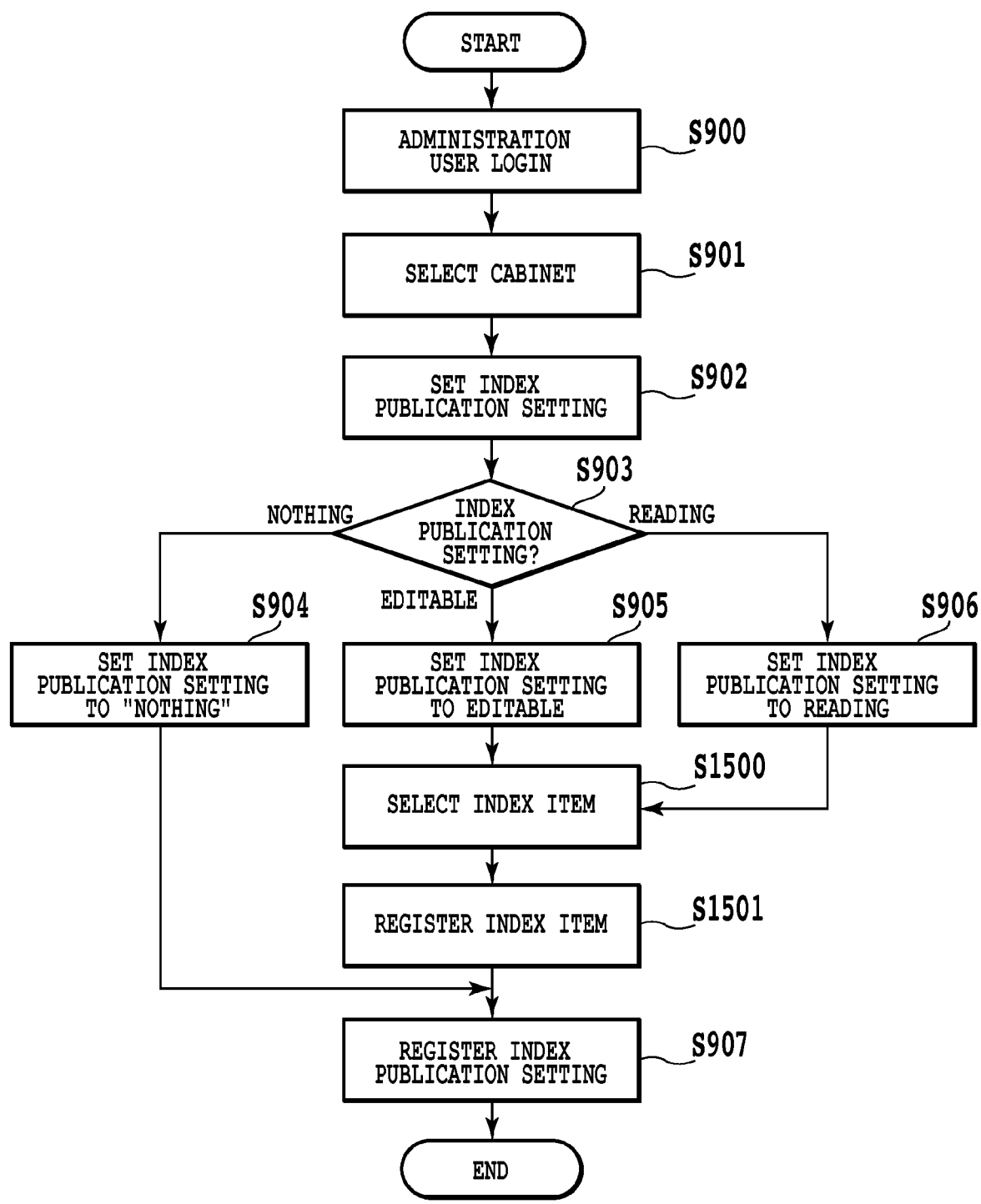
FIG. 15 is a flow chart illustrating an index publication processing according to the second embodiment.

FIG. 15 is a flow chart illustrating processing of setting and registering the index item of the cabinet 600 that can be operated according to the second embodiment. Since most processing is the same as that of the first embodiment illustrated in FIG. 9, only one difference will be described. This difference is that processing at S1500 and S1501 is added to the flow chart.

As with FIG. 8, the document management section 510, user management section 509, control section 513 and sending/receiving section 507 at respective steps show a certain function of the software and the function is actually realized by operation of a CPU, a RAM, an HDD and so on in this specification. Similarly, the database 512 encompasses a logical database that stores each piece of data, and the function is actually realized by operation of a CPU, a RAM, an HDD and so on That is, procedures illustrated in the flow chart is stored in the storage means of either of the RAM and HOD of the control section 513 and database 512 and performed by the CPU.

Only steps that have been changed will be described below and the common steps will not be described. At S1500, selection of the index item is received from the user At S1501, the browser 502 that has received the index item from the user sends the received index item through the network 501 to the sending/receiving section 507 of the server PC 121, which further sends the received index item to the control section 513. The control section 513 registers the received index item into Table 1310 of index items.

Index Item Value Setting Processing in the Second Embodiment

Figure 16:
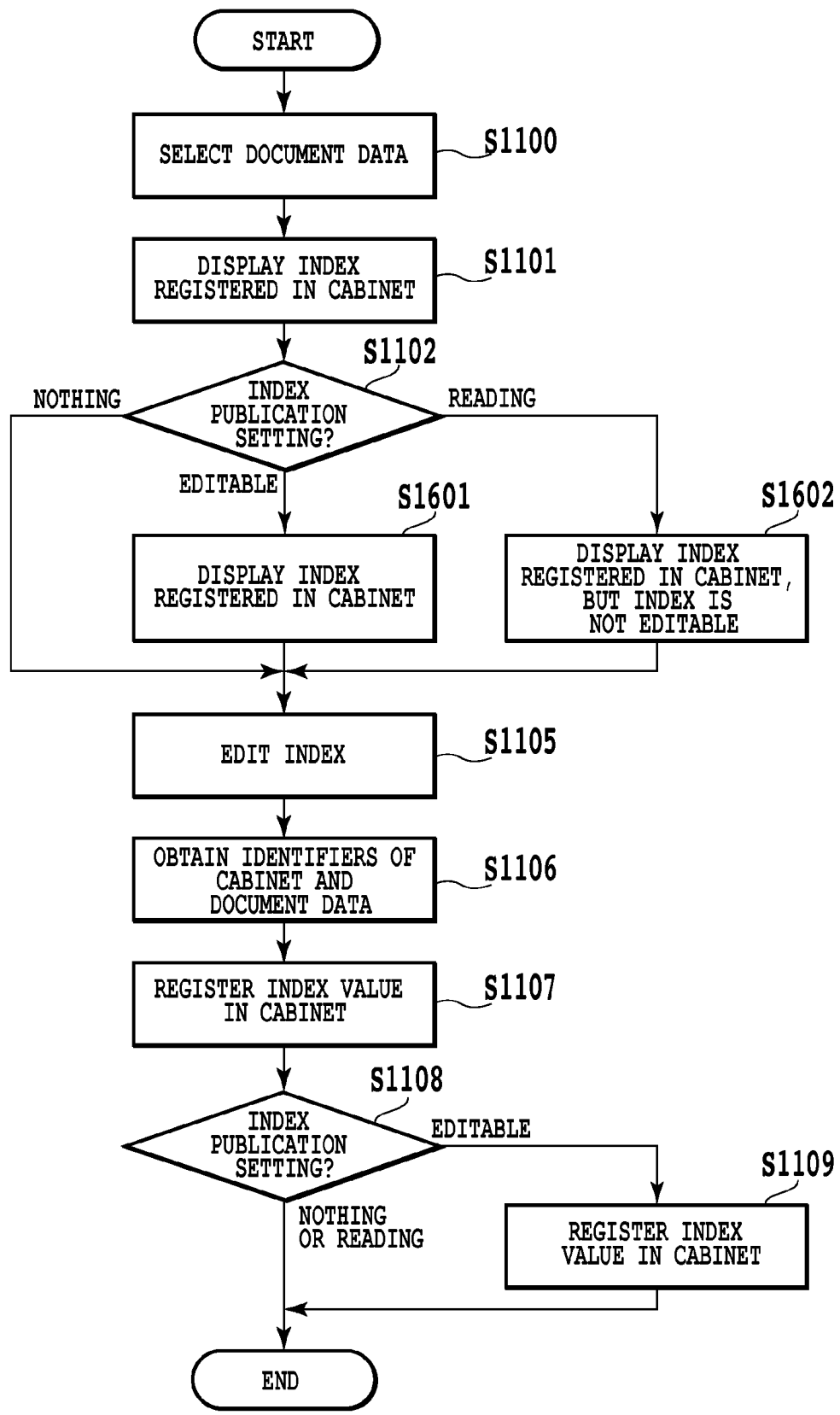
FIG. 16 is a flow chart illustrating an index setting processing according to the second embodiment.

FIG. 16 is a flow chart illustrating processing where the user of the cabinet 700 sets an index item value to the document data 701 of the cabinet 600 according to the present embodiment. Since most of the flow chart is the same as that of the first embodiment illustrated in FIG. 11, only one difference will be described. The difference is that S1103 is changed to S1601, and S1104 is changed to S1602.

Only changed steps will be described below.

If at S1102, the control section 513 determines that index publication setting is "editable", it obtains from Table 612 the index item that can be operated from Table 1310 of index items through the document management section 510 at S1601. Next, the control section 513 obtains from Table 612 the index item value that associates the obtained index item that can be operated with the document data 1301. The control section 513 sends the obtained index item and value back to the browser 502. The browser 502 receives and displays the index item and value.

If at S1102 the control section 513 determines that the index publication setting is "reading", it obtains the index item value that can be operated and associated with the document 1310 at S1602, as with at S1601. The control section 513 sends the obtained index item and value back to the browser 502. The browser 502 receives and displays the index item and value. However, the displayed index item and value are processed so that the user cannot edit them. For this processing, various methods can be used, such as a method that does not receive the operation and a method that receives the operation but does not update the display, but the method is not particularly limited.

Document Data Search Processing in the Second Embodiment

Figure 17:
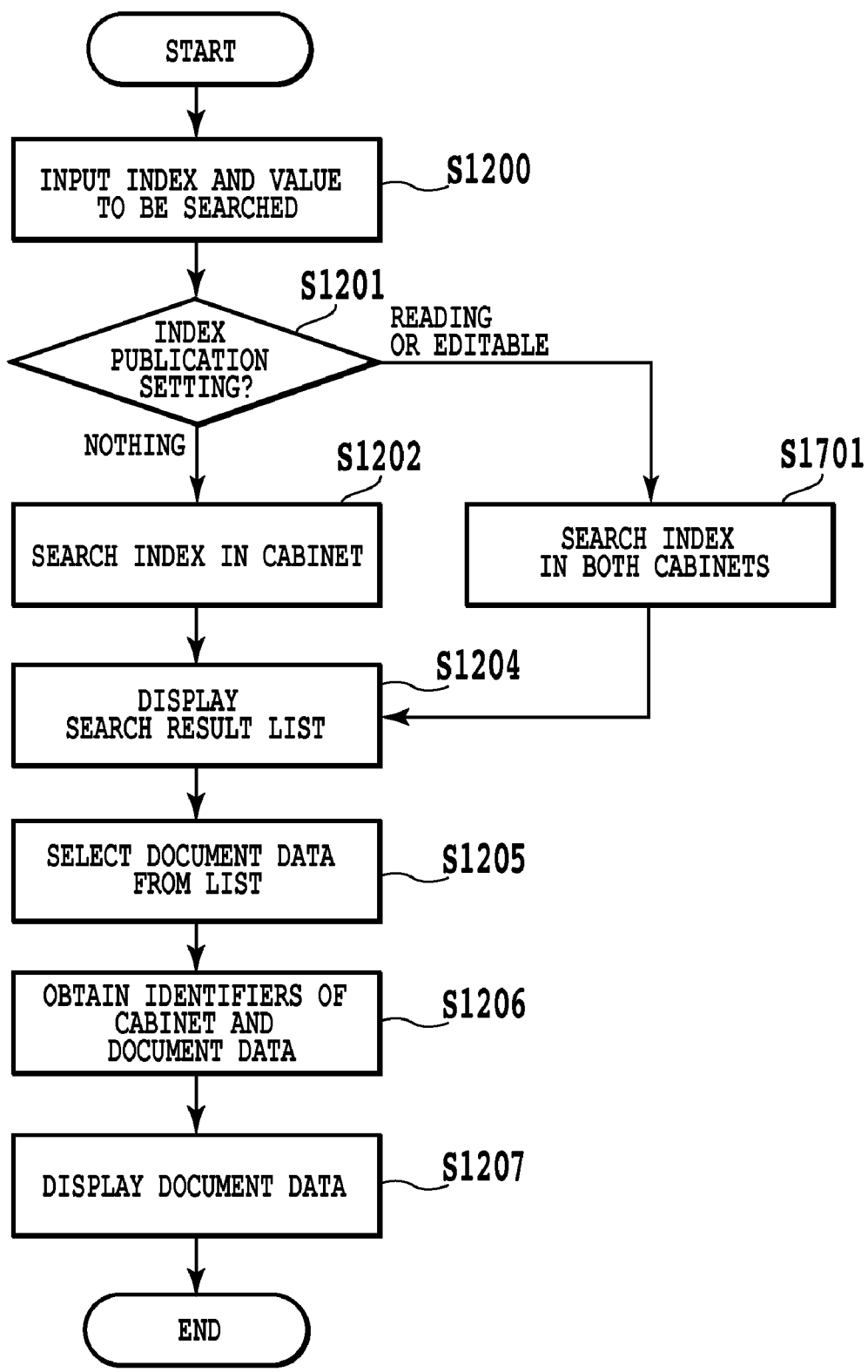
FIG. 17 is a flow chart illustrating a document data search processing according to the second embodiment.

FIG. 17 is a flow chart illustrating processing where the user of the cabinet 700 uses the index item to search document data according to the present embodiment.

Since most of the processing is the same as that of the first embodiment illustrated in FIG. 12, only one difference will be described. The difference is that S1203 is changed to S1701.

Changed steps will be described below.

If at S1201 index publication setting is checked and determined to be "reading" or "editable", the index item that can be operated at S1701 is obtained from Table 1310 of index items. Next, the index item that can be operated and Table 711 are used to search Table 612 of index item values. The search method is not particularly limited, as with at S1202. The control section 513 sends the search result back.

As described above with reference to drawings, by using the second embodiment, the document management system in the first embodiment can be realized for only the index item that can be operated.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-066344, filed Mar. 23, 2010, which is hereby incorporated by reference herein in its entirety.

What is claimed is:

1. A document management system comprising at least one processor, the document management system using an index item defined in each of a plurality of databases to provide an index value to document data managed by each of the plurality of databases, the document management system comprising:
   a document publication setting unit configured to set whether to permit a first user who logs into a first database to access document data managed by a second database, wherein the second database is selected from the plurality of databases by an instruction from the first user; and
   a registration unit configured to use an index item defined in the first database to register an index value as an index value for the document data managed by the second database on the basis of a second instruction from the first user, in a case where the document publication setting unit has set that the first user is permitted to access the document data managed by the second database,
   wherein the registration unit uses the index item defined in the first database, instead of an index item defined in the second database, to register an index value as the index value for the document data managed by the second database on the basis of the instruction from the first user in a case where the first user is permitted to access the document data managed by the second database in the document publication setting unit, as well as in a case where the first user is not permitted to edit an index value of the index item defined in the second database.

2. The document management system according to claim 1 wherein the registration unit registers the index value of the index item defined in the first database, an ID to identify the second database, and an ID to identify document data with the index value in such a way that they are associated with one another.

3. The document management system according to claim 1, further including
   an index publication setting unit configured to whether to permit the first user to edit an index value of the index item defined in the second database,
   wherein the registration unit uses the index item defined in the first database and the index item defined in the second database to register the index value as an index value for the document data managed by the second database on the basis of an instruction from the first user in a case where the first user is permitted to access the document data managed by the second database in the document publication setting unit as well as in a case where the first user is permitted to edit the index value of the index item defined in the second database in the index publication setting unit.

4. The document management system according to claim 1, further comprising a search unit configured to use the registered index value to search the document data.

5. A non-transitory recording medium that stores a program to make a computer function as a document management system that uses an index item defined in each of a plurality of databases to provide an index value to document data managed by each of the plurality of databases, the program making the computer function as:
   a document publication setting unit configured to set whether to permit a first user that can log into a first database to access document data managed by a second database, wherein the second database is selected from the plurality of databases by an instruction from the first user; and
   a registration unit configured to use an index item defined in the first database to register an index value as an index value for the document data managed by the second database on the basis of a second instruction from the first user in a case where the first user is permitted to access the document data managed by the second database in the document publication setting section,
   wherein the registration unit uses the index item defined in the first database, instead of an index item defined in the second database, to register an index value as the index value for the document data managed by the second database on the basis of the instruction from the first user in a case where the first user is permitted to access the document data managed by the second database in the document publication setting unit, as well as in a case where the first user is not permitted to edit an index value of the index item defined in the second database.

6. A document management method having a document management unit, the document management unit using an index item defined in each of a plurality of databases to provide an index value to document data managed by each of the plurality of databases, the document management method comprising:
   a document publication setting step for setting to whether to permit a first user that can log into a first database to access document data managed by a second database, wherein the second database is selected from the plurality of databases by an instruction from the first user; and
   a registration step for using an index item defined in the first database to register an index value as an index value for the document data managed by the second database on the basis of a second instruction from the first user in a case where the first user is permitted to access the document data managed by the second database in the document publication setting step, wherein the registration step uses the index item defined in the first database, instead of an index item defined in the second database, to register an index value as the index value for the document data managed by the second database on the basis of the instruction from the first user in a case where the first user is permitted to access the document data managed by the second database in the document publication setting step, as well as in a case where the first user is not permitted to edit an index value of the index item defined in the second database.

* * * * *